United States Patent [19]

Satzler

[11] 4,378,834

[45] Apr. 5, 1983

[54] WHEEL ASSEMBLY MACHINE AND METHOD

[75] Inventor: Ronald L. Satzler, Princeville, Ill.

[73] Assignee: Caterpillar Tractor Co., Peoria, Ill.

[21] Appl. No.: 278,497

[22] PCT Filed: Apr. 13, 1981

[86] PCT No.: PCT/US81/00486

§ 371 Date: Apr. 13, 1981

§ 102(e) Date: Apr. 13, 1981

[87] PCT Pub. No.: WO82/03603

PCT Pub. Date: Oct. 28, 1982

[51] Int. Cl.³ .............................................. B60C 25/06
[52] U.S. Cl. .................................................... 157/1.1
[58] Field of Search .......................... 29/235, 238, 252;
157/1, 1.1, 1.11, 1.17, 1.33, 1.35

[56] References Cited

U.S. PATENT DOCUMENTS

| | | | |
|---|---|---|---|
| 2,635,682 | 4/1953 | Rerick et al. | 157/1.33 X |
| 3,077,224 | 2/1963 | Kacalieff et al. | 157/1.1 |
| 3,266,548 | 8/1966 | Kolosowsky | 157/1.33 |
| 3,882,920 | 5/1975 | Barnes et al. | 157/1.1 |
| 4,108,233 | 8/1978 | Baer et al. | 157/1.37 |

*Primary Examiner*—James G. Smith
*Attorney, Agent, or Firm*—Richard F. Phillips

[57] ABSTRACT

A wheel assembly machine (10) for mounting first and second rim halves (20) on a tire (14). Means (34) for expanding at least a portion of a first circumferential portion (24) permits mounting of the second rim half (20) without excessive difficulty or damage to the tire (14). An elevator (58) evenly forces a belt (56) onto the tire (14) avoiding misalignment between the belt (56) and the tire (14). The present invention lessens the likelihood of tire damage or tire-rim misalignment during assembly of a wheel (12).

27 Claims, 2 Drawing Figures

WHEEL ASSEMBLY MACHINE AND METHOD

DESCRIPTION

1. Technical Field

This invention relates generally to methods and apparatus for assembling tires and more specifically to methods and apparatus for assembling rims and belts on closed torus tires.

2. Background Art

The assembly of certain types of tires is an awkward and time consuming procedure. This is especially true for closed torus (that is, beadless) tires having a split rim.

Wheels incorporating beadless tires are generally assembled as follows. A vacuum is drawn on the carcass forcing it into a state of partial collapse. The belt of the beadless tire is then manually positioned around the outer diameter of the carcass and the vacuum is withdrawn permitting the carcass to engage the belt with a firm interference fit. The two rim halves are then positioned on either side of the inner diameter and pulled into abutting relationship with hydraulic jacks. The rims are then joined together with bolts, the valve stem is inserted and the tire is inflated. Apparatus for accomplishing this is disclosed in U.S. Pat. No. 3,882,920 issued to Barnes et al. on May 13, 1975.

This procedure has several disadvantages. Although drawing a vacuum on the carcass forces it to collapse to an extent permitting the belt to be positioned about it without significant difficulty, this procedure is detrimental in that collapse of the carcass results in significant distortion of the outer diameter of the carcass. As the carcass returns from its collapsed condition, contact between the belt and the outer diameter often prevents the outer diameter from returning to a fully undistorted condition. As a consequence, the mating elements of the belt and the tire often do not align correctly. This misalignment is rectified in assembly by such measures as beating on the belt and tire with a sledge hammer until the alignment is improved.

A second disadvantageous feature of existing assembly techniques for beadless and certain other tires is a consequence of the rim halves being pulled toward one another as they are simultaneously mounted. As the rims are forced into position in this manner, the carcass has a tendency to buckle inward or otherwise distort at a position intermediate the two rim halves. This distortion sometimes imposes detrimental stresses on the carcass and occasionally results in a portion of the carcass material being pinched between the rim halves. This pinching makes proper seating of the rim halves more difficult and can be injurious to the tire carcass.

The present invention is directed to overcoming one or more of the problems as set forth above.

DISCLOSURE OF THE INVENTION

A method is disclosed for mounting a two-piece rim on a beadless tire. The two-piece rim has first and second halves, the beadless tire has a rim abutting portion and the rim abutting portion has a first portion abuttable with the first rim half and a second portion abuttable with the second rim half. This method comprises the steps of: supporting a portion of the diameter of the first portion; positioning the second rim half into proper abutment with the second portion; releasing the first portion; and, positioning the first rim half into abutment with the first portion.

A machine is disclosed for assembling a wheel, said wheel having a two-piece rim with first and second rim halves, a tire carcass and a belt. The wheel has a tire having a rim abutting portion and the rim abutting portion has a first portion abuttable with the first half and a second portion abuttable with the second half. The machine comprises means for supporting said tire, means for drawing said second rim half into abutting relationship with the second portion, and means for expanding the diameter of a portion of the first portion.

In mounting a two-piece rim on a closed torus tire, it is important to avoid buckling of the carcass inside diameter. This buckling, if allowed to occur, can result in improper positioning of the roll restraining hoops of the tire on the rim. Additionally, this buckling can cause pinching which can result in damage to the tire. The present invention supports and expands a portion of the rim abutting surface of the tire allowing the first-inserted split rim half to be inserted into an abutting portion of the two-piece rim portion of the tire without misalignment or damage to the tire. This expansion of a portion of the rim abutting surface of the tire also establishes an interference fit securing the tire from displacement as the belt is forced onto the tire.

BEST MODE FOR CARRYING OUT THE INVENTION

Figure 1:
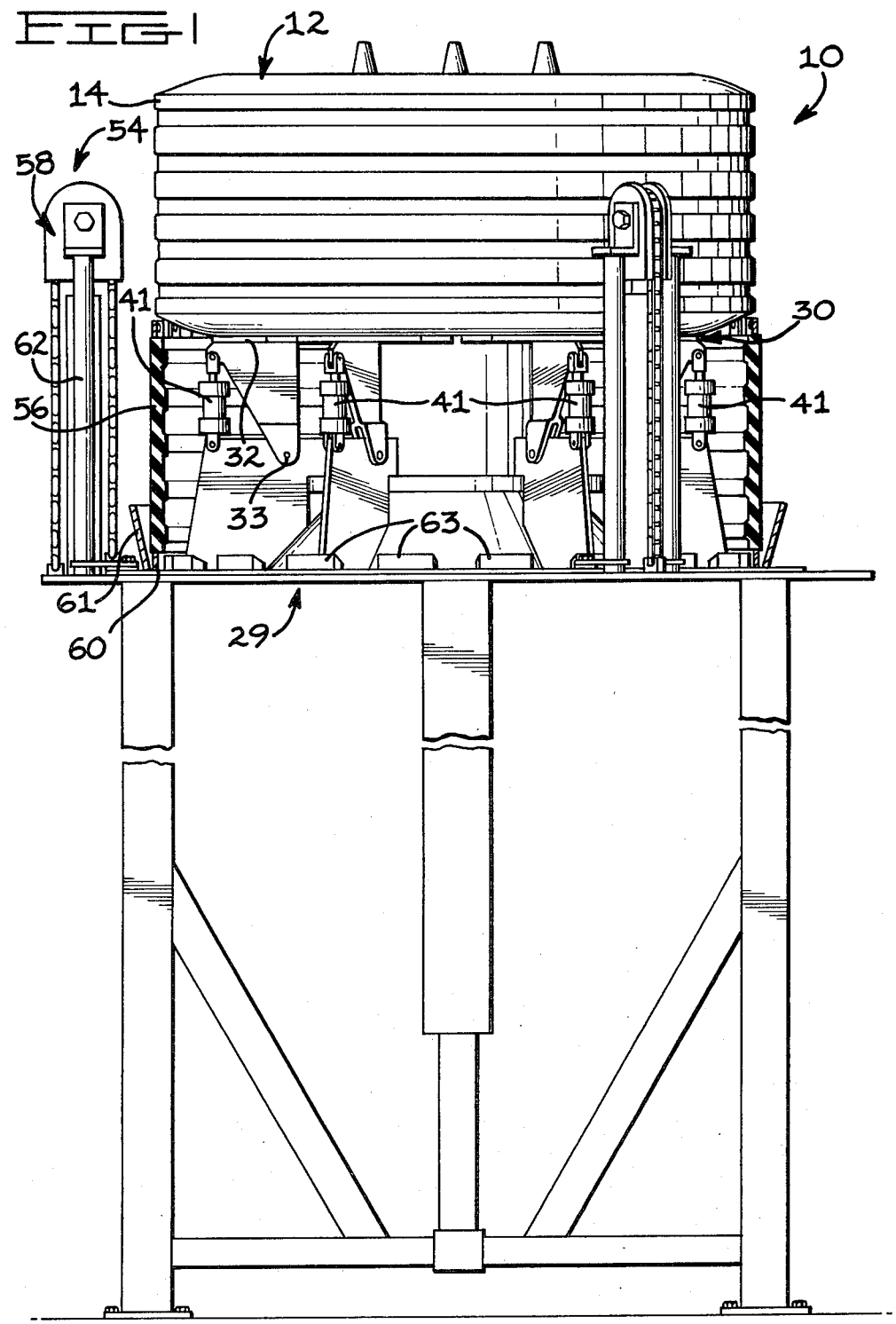
FIG. 1 shows a diagrammatic elevational view partly in cross section of an embodiment of the present invention suited for carrying out the process of the present invention.

Referring to the drawings, a wheel assembly machine embodying the principles of the present invention is generally indicated by the reference numeral 10. This wheel assembly machine 10 is especially suited for wheels 12 having a closed torus (beadless) tire 14 and a two-piece rim 16. The tire 14 has a central cavity 15 adapted for containing pressurized gas. The two-piece rim 16 has a first rim half (not shown) and a second rim half 20. The beadless tire 14 has a rim abutting surface 22 having a first portion 24 abuttable with the first rim half and a second portion 26 abuttable with the second rim half 20. The first portion 24 has an inter-hoops area 25 located between a roll restraining hoop 27 in the first portion 24 and the second portion 26.

Figure 2:
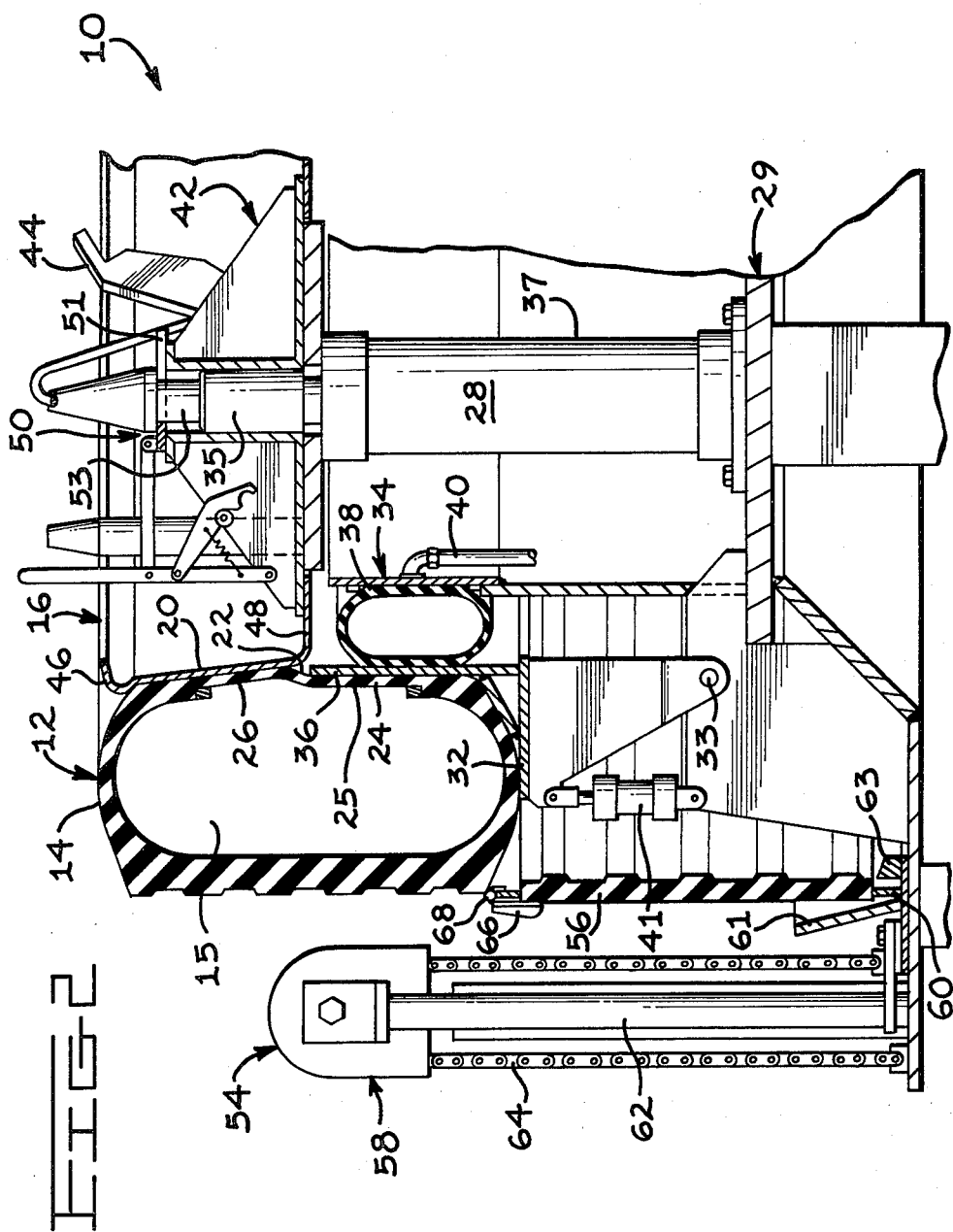
FIG. 2 shows a cross sectional diagrammatic elevational view of a detail of FIG. 1. In this view the rim handling fixture is shown attached to a fully inserted second rim half and the belt is shown in its pre-mounted position.

The wheel assembly machine 10 includes means 28,42 for controllably drawing said second rim half 20 into abutting relationship with said second portion 26. This means 28,42 may include an extensible-retractable jack, preferably a hydraulic cylinder 28. This hydraulic cylinder 28 is attached to a platform base 29. Attached to this platform base 29 is a wheel support portion 30. The hydraulic cylinder 28 is controllable to provide the compressive force necessary to mount the second rim 20 onto the tire 14. The hydraulic cylinder 28 has an extensible portion 35 and a stationary portion 37. The wheel support portion 30 comprises a plurality of substantially horizontal first plates 32, each pivotally mounted about horizontally extending pivot pins 33, as best shown in FIG. 2.

Means 34 is provided for supporting and expanding the diameter of the inter-hoops area 25 of the first portion 24 of the tire 14. This means 34 can assume many embodiments. Preferred is a series of controllably positionable second plates 36, each extending substantially vertically from and rigidly attached to a corresponding one of said horizontal first plates 32. The second plates 36 define a surface which is circumscribed by a cylindrical surface concentric with said hydraulic cylinder 28 and said tire 14. Preferably, there are at least six second plates 36, these plates 36 contacting at least 320° of the circumference of the first portion 24 of the tire 14. In the preferred embodiment, the second plates 36 are curved so as to better conform to the surface of the first portion 24 of the tire 14.

An expanding toroidal bladder 38 for forcing the second plates 36 toward the tire 14 abuts the second plates 36 and is positioned intermediate the second plates 36 and the hydraulic cylinder 28. The expanding bladder 38 may be a closed torus radial tire. Significant outward expansion of the expanding bladder 38 is desired, consequently the bladder 38 does not contain significant circumferential reinforcement.

The expanding bladder 38 is controllably pressurized by an air supply means (not shown) which is connected to the expanding bladder 38 by a pneumatic line 40. This air supply means is preferably capable of pressurizing the expanding bladder to about 140 psi. Second plate retraction means 41 is provided for retracting the second plates 36. The retraction of the second plates 36 serves to collapse the expanding bladder 38 after it is depressurized. As shown in FIG. 2, the second plate retraction means 41 is preferably a plurality of hydraulic-type extensible jacks. With the second plates 36 in a retracted condition, the tire 14 can be slipped on and off the tire assembly machine 10.

The means 34 for expanding the diameter of the first portion 24 of the tire 14 may, of course, assume other embodiments. For example, hydraulic cylinders attached to each second plate 36 for extending this plate 36 inward and outward could replace the expanding bladder 38. Similarly, a mechanical expanding mandrel, well known to those skilled in the art, could be utilized to expand the first portion 24 of the tire 14.

Means 42 is provided for attaching the second rim half 20 to the central hydraulic cylinder 28. This can comprise a rim handling fixture 42 suspended from an overhead crane (not shown). As best shown in FIG. 2, this rim handling fixture 42 includes locking portions 44 engageable in a rim edge 46 of the second rim half 20 to permit grasping and lifting of the rim 20. The rim handling fixture 42 also abuts a center portion 48 of the second rim half 20 allowing a downward force applied to the rim handling fixture 42 to serve to pull the second rim half 20 downward.

Engagement means 50 is included for selectively connecting the central hydraulic cylinder 28 to the rim handling fixture 42. This permits the central hydraulic cylinder 28 to grasp the rim handling fixture 42 and force the rim 20 downward onto the tire 14. Preferably, the engagement means 50 comprises a U-shaped insertion member 51 connected to the rim handling fixture 42. This insertion member 51 is selectively insertable around a narrowed portion 53 of the hydraulic cylinder 28. This is shown in FIG. 2. Numerous other acceptable engagement means 50 are known to those skilled in the art.

Tire inflation means (not shown) is provided for controlling the pressure of the tire 14 during the process of mounting the rims 20. The tire 14 has a port (not shown) passing through a position centered on the inside diameter of the tire 14. Through this port a valve stem is attached once the first rim half 20 is positioned. During assembly of the wheel, the tire inflation means pressurizes the central cavity 15 through this port. The tire inflation means may use the same compressed air supply (not shown) as is used for controlling the force exerted by the expanding bladder 38.

Means 54 is included for mounting a belt 56 on the tire 14. In the preferred embodiment, an elevator 58 is used to move the belt 56 axially onto the tire 14. The elevator 58 has a belt support 60 on which the belt 56 rests. Adjacent the belt support 60 is a positioning element 61 for maintaining the belt 56 in the proper alignment for mounting on the tire 14. A stop 63, also adjacent the belt support 60, abuts the tire 14 when the belt 56 is correctly positioned preventing the belt 56 from being moved any further.

Hydraulic elevator cylinders 62 provide the lifting force to the belt support 60. This force is transmitted through lift chains 64 trained over the hydraulic elevator cylinders 62. One end of the lift chains 64 is attached to an immovable portion of the wheel assembly machine 10 and the other end of each lift chain 64 is fixed relative to the belt support 60. This arrangement permits a 1 unit displacement of the elevator cylinders 62 to displace the belt 56 2 units.

An annular protective cap 66 is positioned atop the belt 56 prior to mounting the belt 56 on the tire 14. This cap 66 has a smooth annular guide 68 for facilitating the travel of the belt 56 onto the tire 14. The cap 66 is removed once the belt 56 is properly positioned.

Industrial Applicability

The present invention is especially suited for assembling a wheel 12 comprising a two-piece rim 16 and a closed torus tire 14. In the operation of the present invention, the closed torus tire 14 is positioned on the wheel support portion 30 of the wheel assembly machine 10. With the second plate retraction means 41 in float, the expanding bladder 38 is pressurized to a magnitude sufficient for preventing translation of the tire 14. The hydraulic elevator cylinders 62 are then activated and the belt 56 is forced onto the immobilized tire 14. The extension of the elevator cylinders 62 is continued until the stop 63 abuts the tire 14, at which point the belt 56 is correctly positioned. The elevator 54 is thereafter retracted.

The rim handling fixture 42 is used to grasp a second rim half 20. The rim handling fixture 42, depending from an overhead crane (not shown), positions the second rim half 20 in axial alignment with the tire 14 with the second rim half 20 being separated an axial distance from the second portion 26 of the tire 14. At this stage the pressure of the tire 14 is set in the range of 0–20 psi, preferably at 0 psi. The central hydraulic cylinder 28 then is latched onto the rim handling fixture 42 through use of the engagement means 50. The means 34 for expanding the first portion diameter is adjusted to apply a diameter increasing force to the first portion 24 of the tire 14. This force should be sufficient to support the profile of the first portion 24 during installation of the belt and second rim half. This expansion is preferably sufficient to substantially prevent buckling of the rim abutting surface 22 of the tire 14 as the second rim half 20 is inserted. In the present invention, inflation of the bladder 38 to about 140 psi is sufficient for this purpose.

The second rim half 20 is then assembled to the tire 14 by drawing the central hydraulic cylinder 28 and rim handling fixture 42 downward. As the second rim half 20 is moved from an uninserted position to a fully inserted position, the pressure of the tire 14 is increased. We have found that for industrial tires which are to be operated at a pressure of about 120 psi, the tire pressure during assembly should be continuously increased to a magnitude in the range of about 30-140 psi. Preferably, for industrial tires to be operated at about 100 psi, the pressure should be raised from an initial level of 0 psi to a final level of 80 psi as insertion of the first rim half 20 is completed.

With the second rim half 20 fully inserted, the rim handling fixture 42 is released and the tire 14 is removed from the tire assembly machine 10. The first rim half is then placed on a support surface and oriented such that the partially assembled wheel 12 may be lowered upon it in correct alignment. The partially assembled wheel 12 is then pulled onto the first rim half in a manner well known to those skilled in the art and the rim halves 20 are bolted together. The support surface on which the second rim half 20 is supported while drawing the first rim half (not shown) and tire 14 into abutment may be the wheel support portion 30. Hence, a single machine 10 may be used for the entire assembly procedure. Alternatively, separate machines may be used for joining each of the rims to the tire 14.

A special advantage of the present invention is the dual function of the means 34 for expanding the inter-hoops area 25 of the first portion 24. Primarily the means 34 for supporting and expanding the inter-hoops area is used to support, stiffen and expand the inter-hoop area 25 of the first portion 24 to facilitate mounting of the second rim half 20. Additionally, this means 34 is used to expand the first portion diameter prior to mounting the belt 56. This serves to grasp the tire 14 thereby preventing movement of the tire 14 during the process of forcing the belt 56 onto the tire 14. The force exerted on the first portion 24 by this means 34 is sufficient in magnitude to totally restrain the tire 14 from upward movement and provides an interference fit between the otherwise unrestrained tire 14 and the tire assembly machine 10.

Other aspects, objects, advantages and uses of this invention can be obtained from a study of the drawings, the disclosure and the appended claims.

I claim:

1. A method for mounting a two-piece rim (16) having first and second rim halves (20) on a closed torus tire (14), the closed torus tire (14) having a rim abutting surface (22), said rim abutting surface (22) having a first portion (24) abuttable with the first rim half and a second portion (26) abuttable with said second rim half (20), said method comprising:
   supporting the first portion (24) of the tire (14);
   positioning the second rim half (20) into abutment with the second portion (26) of the tire (14);
   releasing the first portion (24) of the tire (14); and
   positioning the first rim half into abutment with the first portion (24) of the tire (14).

2. The method, as set forth in claim 1, including:
   increasing the pressure of the tire (14) as the second rim half (20) is positioned on the tire (14).

3. The method, as set forth in claim 1, including:
   increasing the pressure of the tire (14) to a magnitude in the range of about 30-140 psi as the second rim half (20) is inserted into abutment with said second portion (26).

4. The method, as set forth in claim 1, wherein the tire (14) is adapted to receive a belt (56), wherein immediately after expansion of the diameter of the first portion of the tire the following step is included:
   positioning said belt (56) on said tire (14).

5. The method, as set forth in claim 1, wherein said first portion (24) has a flexible inter-hoops area (25), wherein the step of supporting the first portion (24) includes applying a diameter expanding force to said inter-hoops area (25).

6. A machine (10) adapted for assembling first and second rim halves (20) and a closed torus tire (14), said tire (14) having a rim abutting surface (22), said rim abutting surface (22) having a first portion (24) abuttable with a first rim half, and a second portion (26) abuttable with said second rim half (20), comprising:
   a base (29);
   support means (30) for supporting said tire (14) and locating said tire (14) axially on said machine (10), said support means (30) being mounted on said base;
   means (28,42) for controllably drawing said second rim half (20) into abutting relationship with said second portion (26), said drawing means (28,42) being mounted on said base (29); and
   expander means (34) adapted for restraining said first portion (24) of said tire (14) from substantial radial movement relative to said drawing means (24,42), said expander means being mounted on said base (29) and adapted for abutment with said first portion (24).

7. The machine (10), as set forth in claim 6, wherein said means (28,42) for controllably drawing said second rim half (20) includes an extensible-retractable jack (28) and a rim handling fixture (42).

8. The machine (10), as set forth in claim 7, wherein said extensible-retractable jack (28) has a stationary portion (37) connected to said base (29) and an extensible portion (35) selectively connected to said rim handling fixture (42).

9. The machine (10), as set forth in claim 8, wherein said means (30) for supporting said tire (14) comprises a wheel support portion (30) connected to said platform base (29), said wheel support portion (30) being disposed around said hydraulic cylinder (28).

10. The machine (10), as set forth in claim 9, wherein said wheel support portion (30) includes a plurality of first plates (32), said first plates (32) being adapted to support said tire (14).

11. The machine (10), as set forth in claim 10, wherein said first plates (32) are pivotally connected to said platform base (29) for movement toward and away from said extensible-retractable jack (28).

12. The machine (10), as set forth in claim 10, wherein said means (34) for expanding the diameter of said first portion (24) includes a plurality of second plates (36) pivotally connected to said platform base (29) for movement toward and away from said extensible-retractable jack (28), said second plates (36) being adapted to contact said first portion (24) of said tire (14).

13. The machine (10), as set forth in claim 12, further including means (38,40) for controllably pivoting said second plates (36).

14. The machine (10), as set forth in claim 13, wherein said means (38,40) for controllably pivoting includes an inflatable bladder (38), said bladder (38) being positioned intermediate said second plates (36) and said extensible-retractable jack (28).

15. The machine (10), as set forth in claim 14, wherein said bladder (38) is toroidal and is substantially coaxial with said extensible-retractable jack (28).

16. The machine (10), as set forth in claim 14, further including a second plate retraction means (41) for pivoting said second plates (36) toward said extensible-retractable jack (28).

17. The machine (10), as set forth in claim 16, wherein said second plate retraction means (41) is an extensible jack.

18. The machine (10), as set forth in claim 17, wherein said extensible jack (41) is a hydraulic cylinder.

19. The machine (10), as set forth in claim 13, wherein at least one of said second plates (36) is rigidly connected to one of said first plates (32).

20. The wheel assembly machine (10), as set forth in claim 6, further including means (54) for positioning a belt (56) on said tire (14).

21. The machine (10), as set forth in claim 20, wherein said means (54) for positioning a belt (56) includes at least one elevator (58) connected to said base (29).

22. The machine (10), as set forth in claim 21, wherein said means (54) for positioning a belt (56) includes a belt support (60) controllably positionable by said elevator (58).

23. The machine (10), as set forth in claim 7, wherein said extensible-retractable jack (28) is a hydraulic cylinder.

24. A method for mounting a two-piece rim (16) having first and second rim halves (20) on a closed torus tire (14), the closed torus tire (14) having a rim abutting surface (22), said rim abutting surface (22) having a first portion (24) abuttable with said first rim half and a second portion (26) abuttable with said second rim half (20), said first portion (24) having an expandible inter-hoops area (25), said tire (14) being adapted to receive a belt (56) circumferentially therearound, said method comprising:

expanding the diameter of said inter-hoops area (25) of said tire (14);

supporting said belt (56) a spaced axial distance from said tire (14);

axially aligning said belt (56) and said tire (14);

drawing said belt (56) onto said tire (14);

axially aligning said second rim half (20) with said tire (14), said second rim half (20) and tire (14) being a spaced axial distance apart;

drawing said second rim half (20) into abutment with said second portion (26) of said tire (14);

releasing said inter-hoops area (25);

axially aligning said first rim half with said tire (14), said first rim half and tire (14) being a spaced axial distance apart; and positioning said first rim half into abutment with said first portion (24) of said tire (14).

25. The method, as set forth in claim 24, including as an initial step:

supporting said tire (14) on a surface (30) substantially perpendicular to the axis of radial symmetry of said tire (14).

26. The method, as set forth in claim 25, including:

positioning said second rim half (20) such that said tire (14) is intermediate said second rim half (20) and said support surface (30).

27. The method, as set forth in claim 25, including:

supporting said first rim half on said support surface (30).

* * * * *